US009957115B2

(12) United States Patent
Guidi et al.

(10) Patent No.: US 9,957,115 B2
(45) Date of Patent: May 1, 2018

(54) ASSEMBLY FOR THE SORTED CONVEYANCE OF SUBSTANTIALLY PLATE-LIKE PRODUCTS

(71) Applicant: GIMA S.P.A., Zola Predosa (IT)

(72) Inventors: Giulia Guidi, Bologna (IT); Fabio Sassi, Bologna (IT)

(73) Assignee: GIMA S.P.A., Zola Predosa (IT)

( * ) Notice: Subject to any disclaimer, the term of this patent is extended or adjusted under 35 U.S.C. 154(b) by 0 days. days.

(21) Appl. No.: 15/126,154

(22) PCT Filed: Mar. 5, 2015

(86) PCT No.: PCT/EP2015/054654
§ 371 (c)(1),
(2) Date: Sep. 14, 2016

(87) PCT Pub. No.: WO2015/135838
PCT Pub. Date: Sep. 17, 2015

(65) Prior Publication Data
US 2017/0096304 A1     Apr. 6, 2017

(30) Foreign Application Priority Data

Mar. 20, 2014  (IT) .............................. BO2014A0131

(51) Int. Cl.
*B65G 47/08* (2006.01)
*B65G 47/82* (2006.01)
*B65G 47/68* (2006.01)

(52) U.S. Cl.
CPC ......... *B65G 47/681* (2013.01); *B65G 47/082* (2013.01); *B65G 47/82* (2013.01); *B65G 2201/0202* (2013.01)

(58) Field of Classification Search
CPC ................. B65G 47/681; B65G 47/82; B65G 2201/0202; B65G 47/082; B65G 47/08; B65B 25/005

(Continued)

(56) References Cited

U.S. PATENT DOCUMENTS 3,193,079 A * 7/1965 Winter, IV ........... B65G 47/086
                                                    198/426
3,899,069 A * 8/1975 Heinzer ................ B65G 47/32
                                                    198/426

(Continued)

FOREIGN PATENT DOCUMENTS

EP         0174596 A1    3/1986
EP         2135825 A1    12/2009
(Continued)

OTHER PUBLICATIONS

International Search Report dated May 22, 2015 re: Application No. PCT/EP2015/054654; pp. 1-4; citing: WO 2012/121762 A1, EP 2 135 825 A1, EP 0 174 596 A1 and WO 2013/007773 A2.
(Continued)

*Primary Examiner* — Mark A Deuble
(74) *Attorney, Agent, or Firm* — Cantor Colburn LLP

(57) ABSTRACT

An assembly for the sorted conveyance of substantially plate-like products, the assembly includes a stroke limiting shoulder, downstream of at least one supply line, a first pusher having a lateral surface that faces and is proximate to the stroke limiting shoulder, and at least one second pusher, which is adjacent to the other pusher. The pushers are substantially perpendicular to the advancement direction of the products and are independently movable from a first configuration, in which the respective end face faces and is proximate to the edge of the at least one supply line, to a second configuration, in which the end face faces and is proximate to the edge of the exit channel, surmounting the respective supply line. The exit channel includes consecutive receptacles for accommodating clusters of products.

8 Claims, 7 Drawing Sheets

(58) Field of Classification Search
USPC .......................................................... 198/426
See application file for complete search history.

(56) References Cited

U.S. PATENT DOCUMENTS

| | | | | |
|---|---|---|---|---|
| 4,223,779 | A * | 9/1980 | Hopkins | B65G 47/082 |
| | | | | 198/408 |
| 4,228,901 | A * | 10/1980 | Watzka | B65G 47/8823 |
| | | | | 198/409 |
| 5,460,258 | A * | 10/1995 | Tisma | B65G 47/31 |
| | | | | 198/429 |
| 8,684,165 | B2 * | 4/2014 | Follows | B65G 21/12 |
| | | | | 198/426 |
| 8,789,681 | B2 * | 7/2014 | Silberbauer | B42C 19/08 |
| | | | | 198/426 |

FOREIGN PATENT DOCUMENTS

| | | |
|---|---|---|
| WO | 2012121762 A1 | 9/2012 |
| WO | 2013007773 A2 | 1/2013 |

OTHER PUBLICATIONS

Written Opinion dated May 22, 2015 re: Application No. PCT/EP2015/054654; pp. 1-6; citing: WO 2012/121762 A1, EP 2 135 825 A1 and EP 0 174 596 A1.

* cited by examiner

ASSEMBLY FOR THE SORTED CONVEYANCE OF SUBSTANTIALLY PLATE-LIKE PRODUCTS

TECHNICAL FIELD

The present disclosure relates to an assembly for the sorted conveyance of substantially plate-like products.

It should be noted that the present disclosure is particularly advantageous if the substantially plate-like products have a considerable size tolerance. In particular, therefore, the conveyance assembly according to the disclosure is indicated for chewing gum in "stick" format.

BACKGROUND

A packaging apparatus for chewing gum in sticks is constituted by a series of consecutive stations: a wrapping machine for the individual wrapping, with adapted sheets, of each stick, a supply assembly for arranging the wrapped sticks in consecutive clusters, a stacker assembly for creating the bundle to be packaged and a cartoning machine for inserting the bundle into an adapted package.

The wrapping machine transfers the wrapped sticks to the supply assembly on one or more separate channels; the supply assembly, which is also provided with corresponding channels, has the task of transferring the products to conveyance chutes that lead to the stacker assembly.

Downstream of the stacker, the sticks sorted in bundles are in turn inserted into the package by the cartoning machine.

The format of the bundle to be inserted in the package comprises a plurality of sticks: particularly there is particular interest in bundles made up of seven sticks that are arranged in series on three superimposed layers.

The possibility is not excluded of having to make up bundles that are constituted by a different number (more or fewer) of sticks with respect to the number given in the previous paragraph by way of example.

Unfortunately however the sticks have very considerable size tolerances which negatively influence their correct arrangement in the conveyance chutes.

The size tolerance of sticks of chewing gum is of the order of magnitude of approximately ±4% (and cases are known in which it is even higher), and this means that products with maximum size differences of 8%, i.e. particularly pronounced, could end up being arranged side by side.

So if we are operating on sticks with a nominal width of 11 mm, there may be sticks that are 10.61 mm wide and sticks that are 11.54 mm wide.

In these cases, if we are working on a bundle made up of seven sticks, the maximum tolerance on the length of the bundle, which is made up of seven laterally adjacent sticks, is 6.51 mm (this value is calculated as the difference between the maximum length deriving from seven sticks that are 11.54 mm wide and arranged side by side, i.e. 80.78 mm, and the minimum length of seven sticks that are 10.61 mm wide and arranged side by side).

It should be noted that these sticks generally have a scant thickness, in the region of 5 mm (comprised between 4.74 and 5.08 mm).

When we proceed with the stacking of several bundles of sticks, we find ourselves in an extremely difficult position, in that the risk arises that a stick could rotate and "fall" into the space between two adjacent sticks of the lower layer: in fact it could happen that two adjacent sticks end up at a mutual distance of 6.51 mm (the maximum tolerance allowed on the length of the bundle), which can thus accommodate a stick that is arranged transversely with respect to the others.

If this condition of incorrect positioning arises, the apparatus will not be able to effectively proceed with the cartoning, since this will be made impossible by the transverse arrangement of the stick that "fell" into the channel between two contiguous sticks of the lower layer.

This problem is more evident the bigger the size tolerance is for each individual stick, and the bigger the bundle to be stratified (i.e. constituted by a high number of sticks) is.

In order to guard against these problems, the stacking could be carried out very slowly and by holding each individual stick: this would result in a considerable reduction in efficiency of the plant and in the necessity of having dedicated grip means for each individual type of stick, with a consequent increase in costs and in complexity if a change of format is necessary.

SUMMARY

The aim of the present disclosure is to solve the above mentioned drawbacks, by devising an assembly for the sorted conveyance of substantially plate-like products which guards against a possible incorrect positioning during subsequent stratification/stacking of those products.

Within this aim, the disclosure provides an assembly for the sorted conveyance of substantially plate-like products which makes it possible to adopt high packaging speeds without falling foul of problems of incorrect positioning of one or more sticks.

The disclosure further provides an assembly for the sorted conveyance of substantially plate-like products which does not present particular problems when it is necessary to change the format of the sticks on which to work.

The present disclosure provides an assembly for the sorted conveyance of substantially plate-like products which is low cost, easily and practically implemented, and safe in use.

These benefits are achieved by providing an assembly for the sorted conveyance of substantially plate-like products, of the type interposed between at least one line for supplying plate-like products and at least one channel for the exit of bundles constituted by a predefined number of products, characterized in that it comprises a stroke limiting shoulder, downstream of said at least one supply line, a first pusher having a lateral surface that faces and is proximate to said stroke limiting shoulder, and at least one second pusher, which is adjacent to the other pusher, said pushers being substantially perpendicular to the advancement direction of the products on the respective supply line and being independently movable from a first configuration, in which the respective end face faces and is proximate to the edge of said at least one supply line, externally thereto, to a second configuration, in which said end face faces and is proximate to the edge of said at least one exit channel, surmounting the respective supply line, said exit channel comprising consecutive receptacles for accommodating clusters of products, the sum of all the products of said clusters being equal to said predefined number of products of said bundle.

These benefits are also achieved by providing a method for the sorted conveyance of substantially plate-like products which comprises the steps of receiving products from at least one supply line that is arranged upstream, sending products, suitably clustered to constitute bundles constituted by a predefined number of products each, along at least one exit channel that is arranged downstream, which includes the following steps:

transferring at least one first cluster of products from the at least one supply line to the at least one exit channel;

transferring at least one second cluster of products from the at least one supply line to the at least one exit channel, substantially upstream of said at least one first cluster;

the sum of the products of said at least one first cluster and of said at least one second cluster being equal to the predefined number of products that constitutes said bundle.

BRIEF DESCRIPTION OF THE DRAWINGS

Further characteristics and advantages of the disclosure will become better apparent from the description of a preferred, but not exclusive, embodiment of the assembly for the sorted conveyance of substantially plate-like products according to the disclosure, which is illustrated by way of non-limiting example in the accompanying drawings wherein.

DETAILED DESCRIPTION OF THE DRAWINGS

Figure 1:
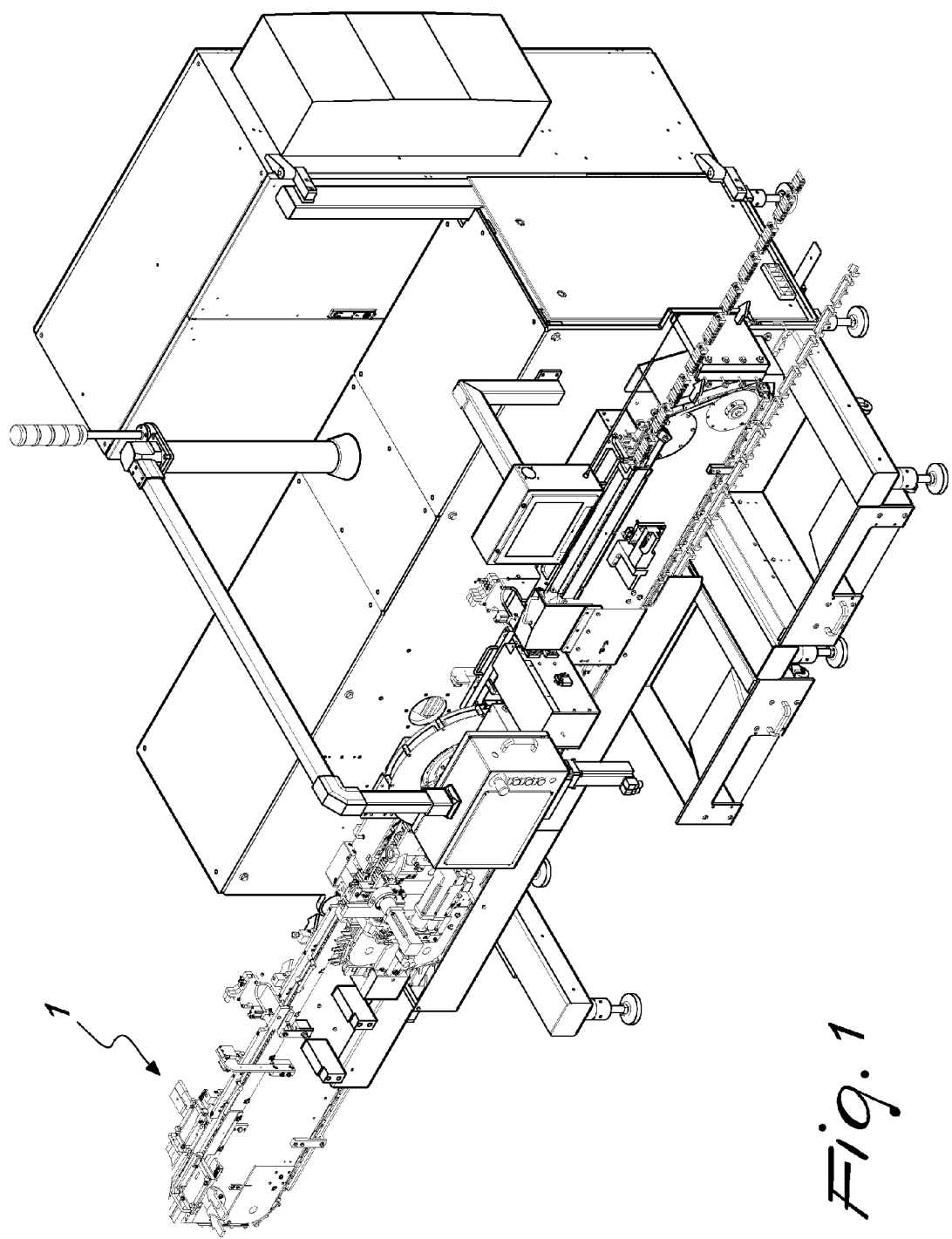
FIG. 1 is a schematic perspective view of an apparatus that comprises an assembly for the sorted conveyance of substantially plate-like products according to the disclosure.
Figure 2:
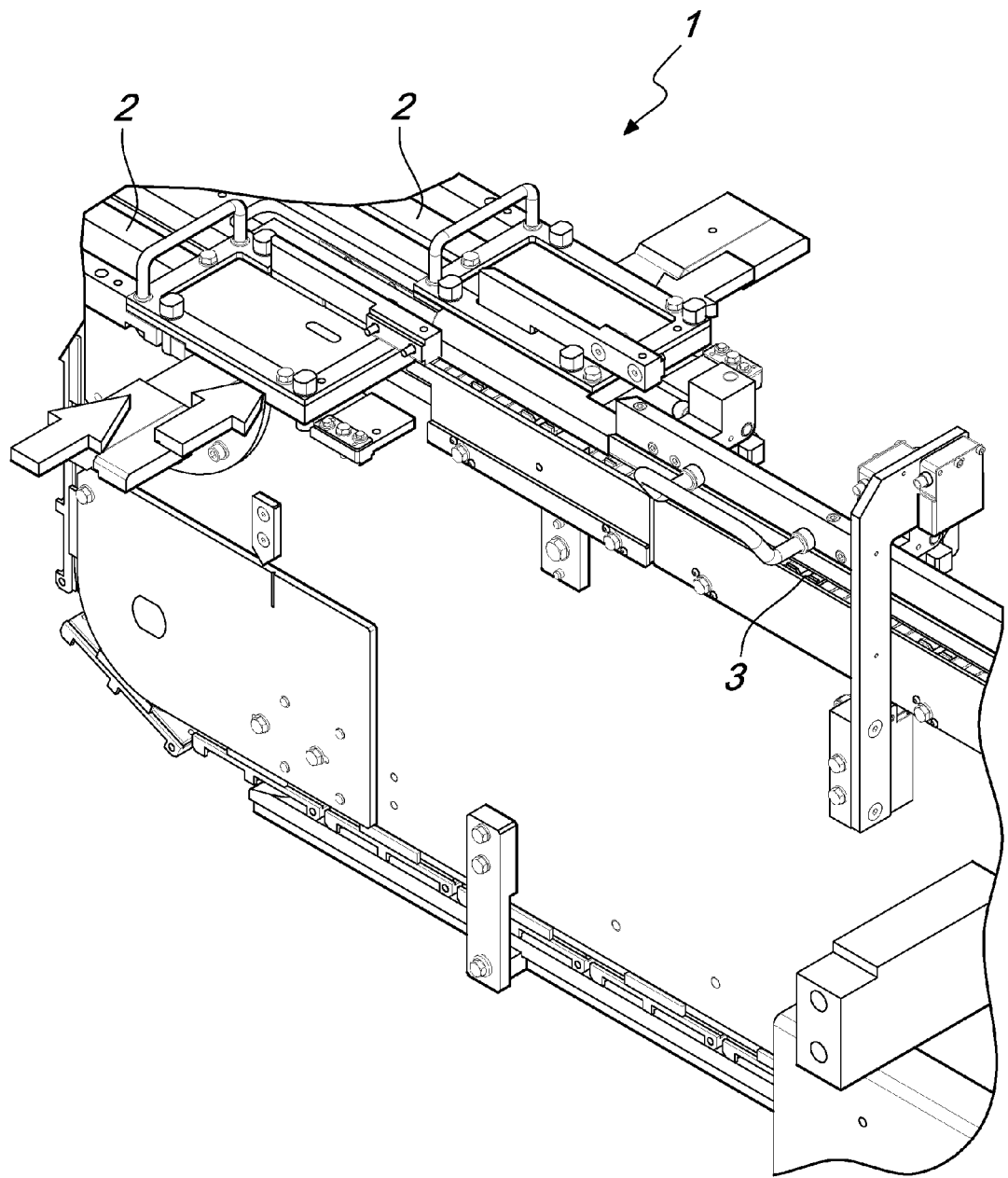
FIG. 2 is an enlarged view of a detail of FIG. 1, showing the assembly according to the disclosure.
Figure 3:
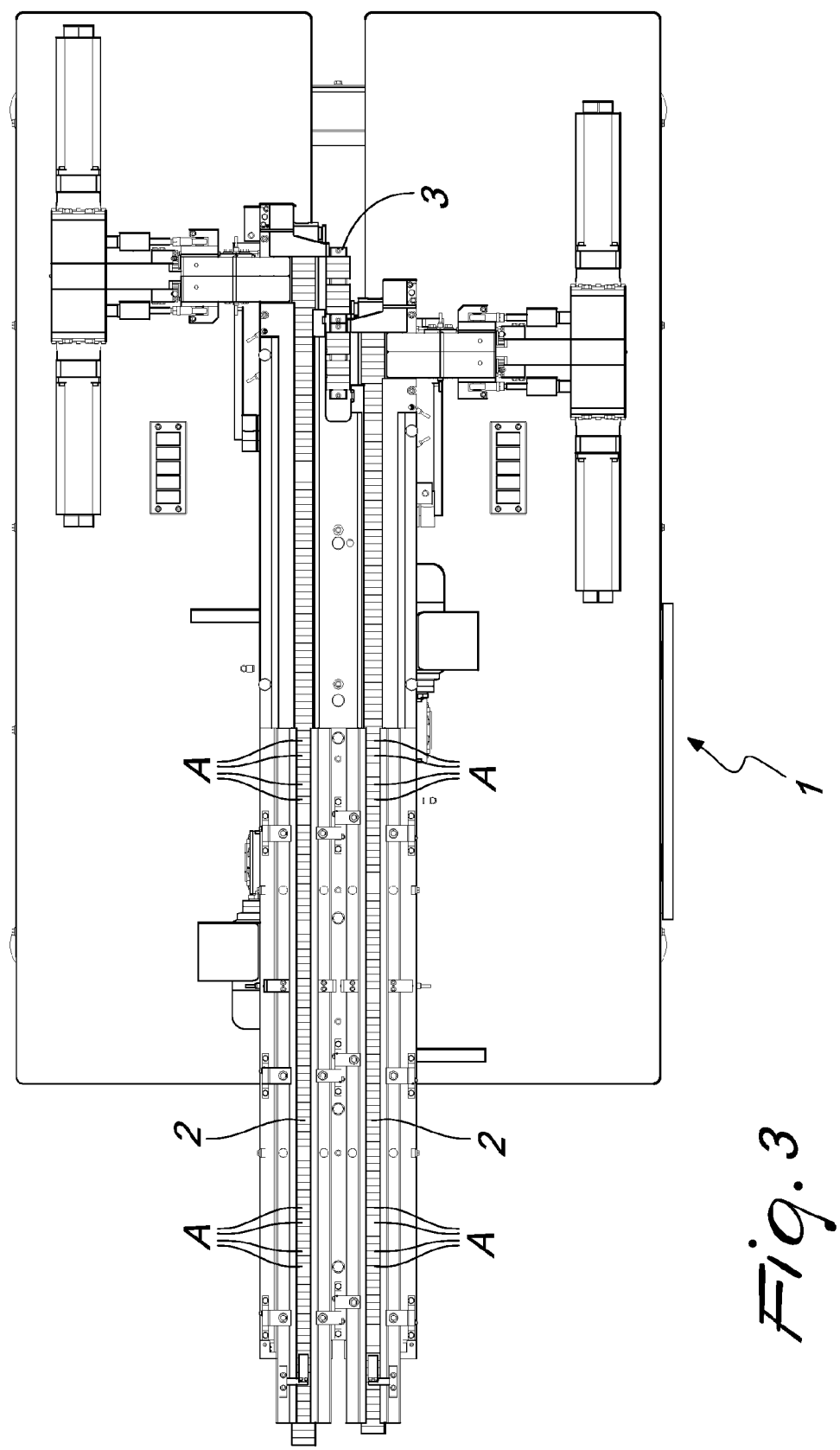
FIG. 3 is a view from above of an assembly according to the disclosure.
Figure 4:
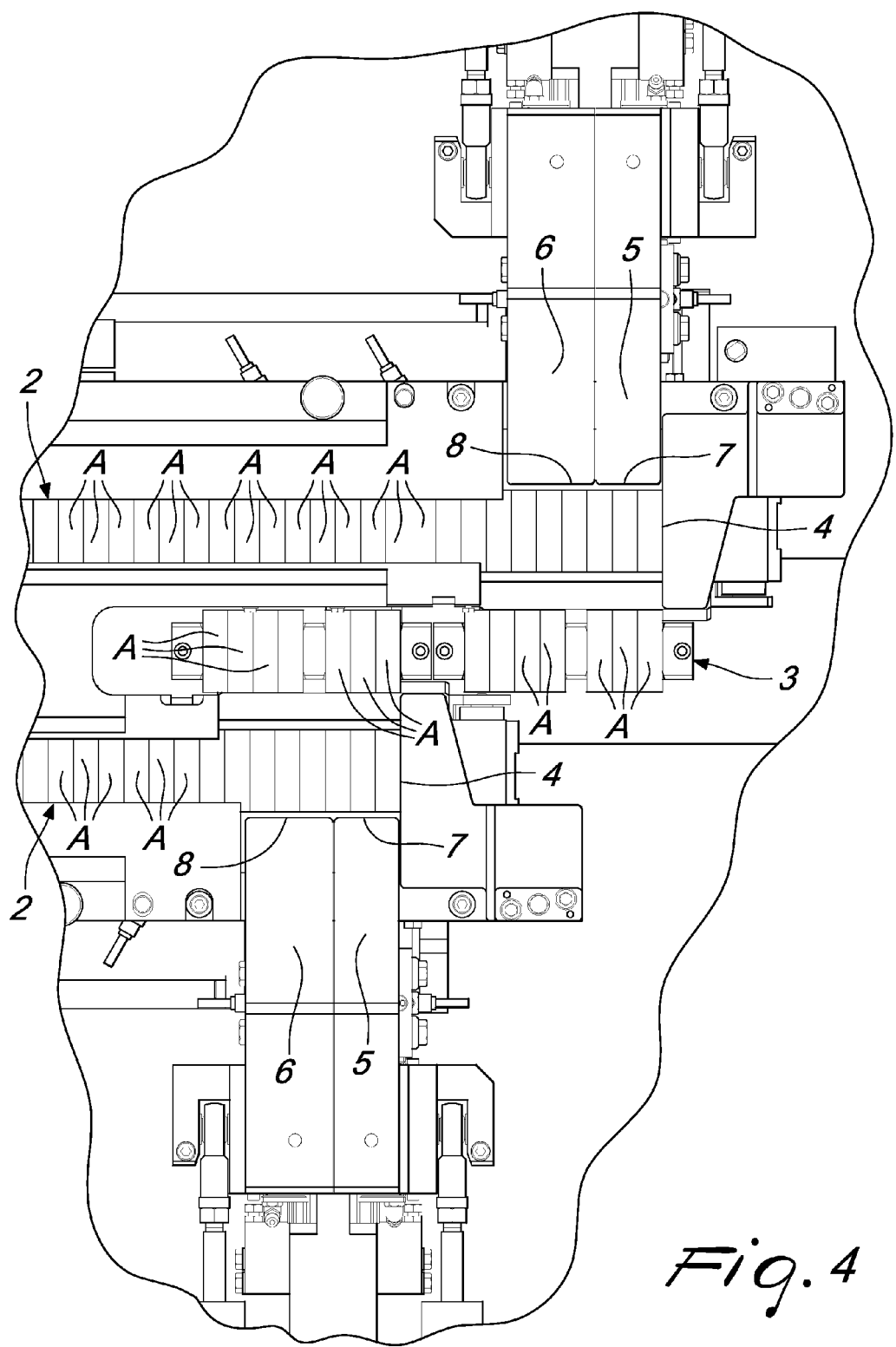
FIG. 4 is an enlarged view of a detail of FIG. 3.
Figure 5:
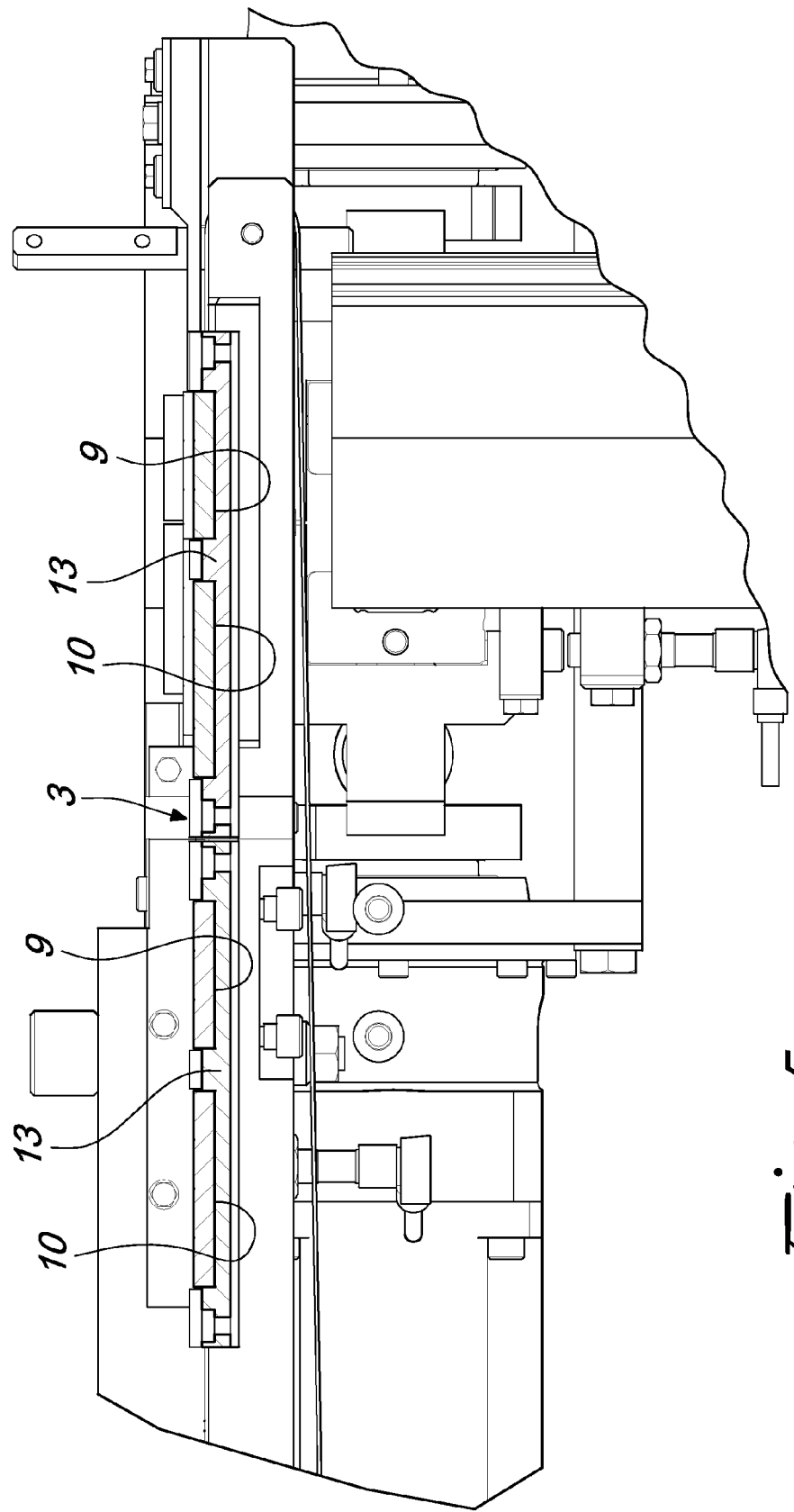
FIG. 5 is a partially sectional side view of an assembly according to the disclosure.
Figure 6:
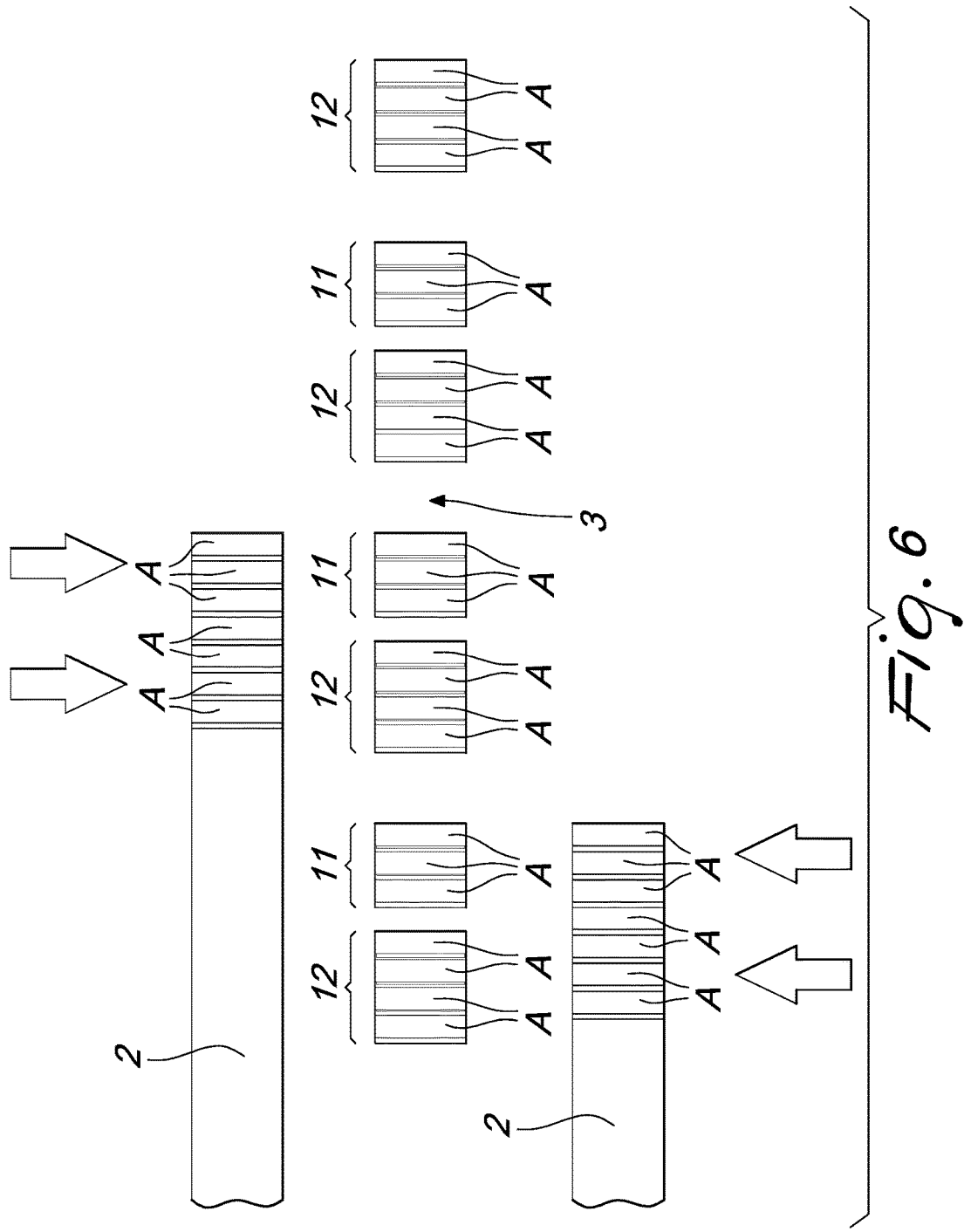
FIG. 6 is a schematic view from above of the operating sequence of the products during the method according to the disclosure.
Figure 7:
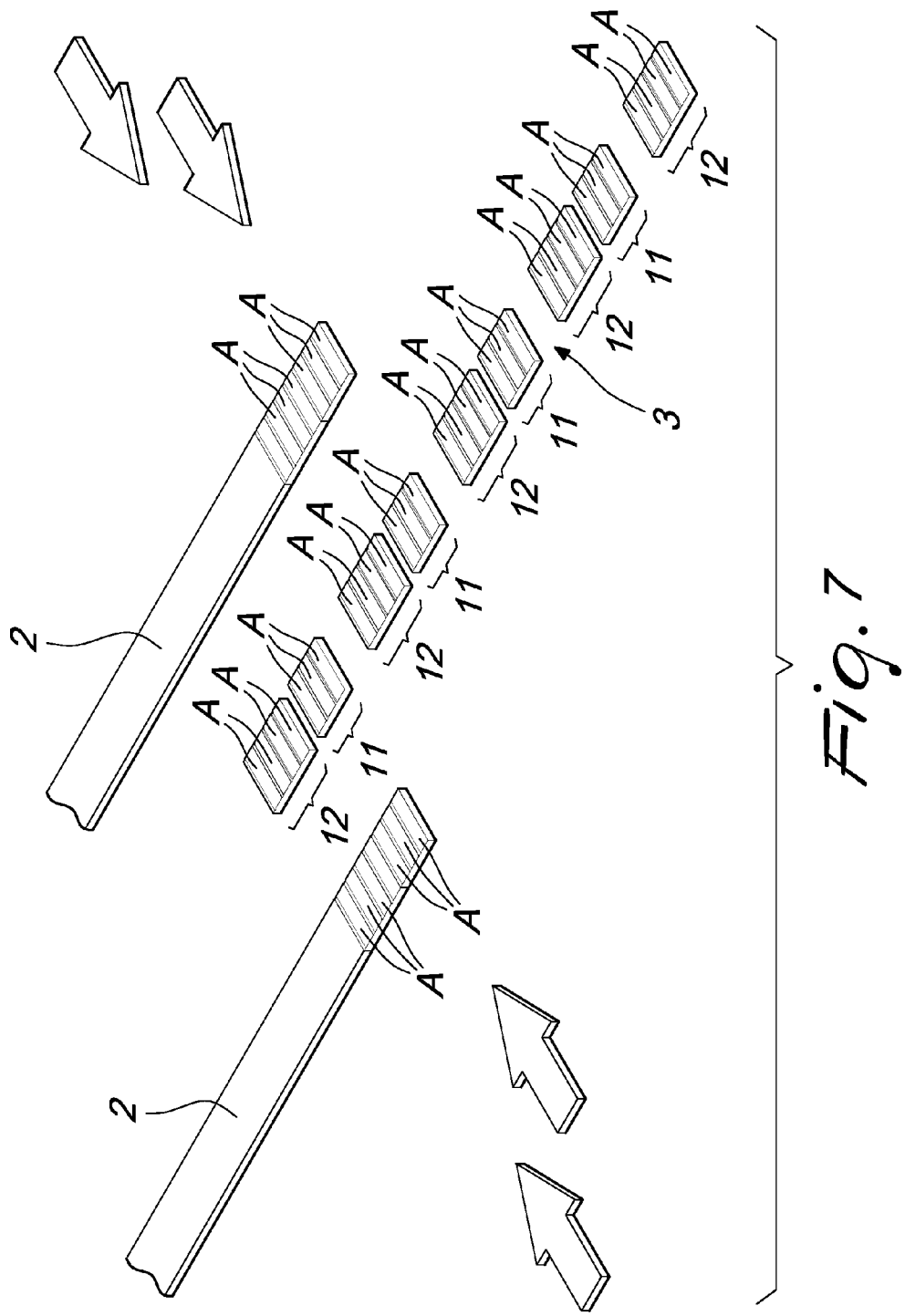
FIG. 7 is a schematic perspective view of the operating sequence of the products during the method according to the disclosure.

With reference to the figures, the reference numeral 1 generally designates an assembly for the sorted conveyance of substantially plate-like products A.

The assembly 1 is intended to be interposed between at least one line 2 for supplying plate-like products A and at least one channel 3 for the exit of bundles constituted by a predefined number of products A.

The assembly 1 according to the disclosure comprises more specifically a stroke limiting shoulder 4, which is arranged downstream of the at least one supply line 2.

In practice the products A are transferred along the line 2 mutually side by side: when the products A arrive at the stroke limiting shoulder 4, they are compacted which determines the contact of each product A with the contiguous one; the product A located furthest downstream rests, with its lateral surface, against the stroke limiting shoulder 4.

The assembly 1 further comprises a first pusher 5 that has a lateral surface that faces and is proximate to the stroke limiting shoulder 4.

The pusher 5 is constituted by a fixed portion to which a movable portion is articulated, which acts by applying thrust to the products A. During its translational movement, the movable portion slides along the surface of the shoulder 4 with a lateral surface thereof.

The assembly 1 further comprises at least one second pusher 6 that is adjacent to the respective pusher 5 that is arranged downstream.

It should be noted that, if the pushers 6 are more than one and they are mutually side by side, each one of them will be contiguous to at least another pusher (5 or 6): in any case the first pusher 5 will still be the furthest downstream with respect to all the others.

It should be noted that the pushers 5 and 6 are arranged perpendicularly to the advancement direction of the products A on the respective supply line 2. The possibility is not excluded of adopting different orientations of the pushers 5 and 6 to the perpendicular orientation.

The pushers 5 and 6 are independently movable from a first configuration, in which the respective end face 7 and 8 faces and is proximate to the edge of the at least one supply line 2, externally thereto, to a second configuration, in which the end face 7, 8 faces and is proximate to the edge of the at least one exit channel 3, surmounting the respective supply line 2.

The exit channel 3 advantageously comprises consecutive receptacles 9, 10 for accommodating clusters 11, 12 of products A.

The sum of all the products A of the clusters 11 and 12 will profitably be equal to the predefined number of products A that constitute the bundle.

According to an embodiment of undoubted practical and applicative interest, which is explained for the purposes of non-limiting example of the present disclosure, the pushers 5, 6 can be two in number.

At each supply line 2 there will thus be only two adjacent pushers 5 and 6.

The first pusher 5 will be arranged downstream of the respective supply line 2 and upstream of the respective stroke limiting shoulder 4.

In particular, a lateral surface of the first pusher 5 will be facing and proximate to the shoulder 4.

The second pusher 6 will on the other hand be arranged upstream of the first pusher 5 (with respect to the respective supply line 2) so that its lateral surface that is located downstream is adjacent to the lateral surface that is located upstream of the first pusher 5.

In such case the pushers 5 and 6 will be independently movable from a first configuration, in which the respective end face 7 and 8 faces and is proximate to the edge of the respective supply line 2, externally thereto, to a second configuration, in which the respective end face 7, 8 faces and is proximate to the edge of the exit channel 3, surmounting the respective supply line 2.

It should be noted, in this particular embodiment, that the exit channel 3 will comprise pairs of consecutive receptacles 9 and 10 for accommodating clusters 11 and 12 of products A.

Similarly to what is explained previously, in this particular case as well, the sum of all the products A of the clusters 11 and 12 will be equal to the predefined number of products A that make up the bundle.

It should be noted that possible embodiments are not ruled out in which there are three or more pushers 5 and 6, which are intended to provide a corresponding number of clusters of products A on the exit channel 3. Such implementation choice will depend on the particular packaging requirements of the products A and on their size tolerances.

It should be noted that each pair of receptacles 9 and 10 will preferably comprise a first receptacle 9 for accommodating at least two products and a second receptacle 10 for accommodating at least three products.

With reference to an embodiment in which a bundle is made up of seven products A arranged side by side, each pair of receptacles 9 and 10 will preferably have to comprise a first receptacle 9 for accommodating three products A arranged side by side and a second receptacle 10 for accommodating four products A arranged side by side.

According to a further possible embodiment which enables a high level of productivity of the apparatus in which the specific assembly 1 according to the disclosure is installed, the supply lines 2 can be two in number, are arranged side by side and are parallel.

Each line 2 will comprise a respective stroke limiting shoulder 4 and, arranged laterally and transversely, a respective first pusher 5 and at least one respective second pusher 6 which is adjacent to the first. The pushers 5 and 6 will be substantially perpendicular to the advancement direction of the products A on the respective supply line 2.

It should be noted that, in the embodiment that has two supply lines 2, the exit channel 3 will conveniently be interposed between the end portions of the two supply lines 2.

The respective pushers 5 and 6 of the first line 2 and of the second line 2 will be arranged externally to the respective line 2 and mutually opposite to the exit channel 3.

With respect to the advancement direction of the products A on the lines 2, the pushers 5 and 6 are mutually offset: each pair of pushers 5 and 6 will in fact be designed to transfer the products A from the respective line 2 to specific receptacles 9 and 10 of the channel 3 that are facing the line 2 at that moment.

In practice the pair of pushers 5 and 6 which are arranged upstream will transfer the products A that are on the respective line 2 into receptacles 9 and 10 of the channel 3 which are arranged upstream, while the pair of pushers 5 and 6 which are arranged downstream will transfer the products A that are on the respective line 2 into receptacles 9 and 10 of the channel 3 which are arranged downstream.

It is convenient to note that the plates 7 and 8 of each pusher 5, 6 have a width that does not exceed the length of the cluster 11, 12 of consecutive products A arranged side by side that it must transfer from the respective supply line 2 to the respective exit channel 3.

In this manner it will be certain that, when the correct alignment happens thereof with the products A that are on the respective line 2, a pusher 5, 6 will transfer only the number of products A that it is supposed to handle (i.e. the number of products A of the respective cluster 11 or 12) into the corresponding seat 11, 12.

It should further be noted that the exit channel 3 can preferably comprise a plurality of units 13, mutually articulated. Each unit 13 will comprise separate receptacles 9 and 10 for accommodating respective clusters 11 and 12 of products A.

If there are more than two pushers 5, 6, then there will be the same number of receptacles present on each unit.

The present disclosure is particularly original and innovative with regard to the method of sorted conveyance of substantially plate-like products A which it is capable of actuating.

In order to be able to actuate the method according to the disclosure it is necessary that there is a supply of products A from at least one line 2 arranged upstream of the area in which the steps of the method will be carried out; at the same time it is necessary that, downstream of the area in which the steps of the method will be carried out, there is the sending of products A, suitably clustered to constitute bundles constituted by a predefined number of products A each, along at least one exit channel 3.

The method according to the disclosure includes carrying out a first step of transferring at least one first cluster 11 of products A from the at least one supply line 2 to the at least one exit channel 3 (which will be in a configuration of alignment with the first cluster 11 that is arranged on the supply line).

Subsequently, during a second step (prior to which the channel 3 will undergo an advancement such that it will be aligned with a further cluster of products A), we proceed to transfer at least one second cluster 12 (which will be correctly aligned with a specific area of the channel 3 with regard to the explanation in the previous step) of products A from the at least one supply line 2 to the at least one exit channel 3, substantially upstream of the at least one first cluster 11.

According to the teachings of the method according to the disclosure, the sum of the products A of the at least one first cluster 11 and of the at least one second cluster 12 will be equal to the predefined number of products A that constitutes the bundle.

It should be noted that, with reference to an embodiment of particular practical and applicative interest of the method according to the disclosure, it will be necessary, in the first step, to transfer at least one respective first cluster 11 of products A from each of the two facing and parallel supply lines 2 to the exit channel 3 that is interposed between the respective end portions of the two supply lines 2.

In the second step, on the other hand, at least one respective second cluster 12 of products must be transferred from each of the two facing and parallel supply lines 2 to the exit channel 3 that is interposed between the respective end portions of the two supply lines 2.

Advantageously we have seen how the present disclosure solves the above mentioned problems, by providing an assembly 1 for the sorted conveyance of substantially plate-like products A which guards against a possible incorrect positioning during the step of subsequent stratification/stacking of those products A.

In fact by subdividing the bundle into two (or more) clusters 9 and 10 which are constituted by a low number of products A each, even if these products have high size tolerances, each one of them will be arranged at a distance from the next one which is not greater than the thickness of a product A.

This ensures that, in a possible subsequent step of stratification and/or stacking, the products A of the upper layers cannot arrange themselves transversely between two contiguous products A of the lower layer, because the mutual distance between them will not allow it.

Conveniently the assembly 1 for sorted conveyance according to the disclosure makes it possible to adopt high packaging speeds without falling foul of problems of incorrect positioning of one or more sticks (products A).

In fact the subdividing into clusters 11 and 12 which are made up of a low number of products A prevents the free spaces between each product A and the contiguous products from being greater than or equal to the thickness of each individual product A.

In this manner it will not be necessary to manipulate the products A slowly, given that the arrangement that could cause problems in the subsequent steps of the packaging process is entirely avoided by the subdivision into different clusters 11 and 12 each of which is contained in a respective receptacle 9, 10.

Positively the assembly for sorted conveyance 1 presents no particular problems when it is necessary to change the format of the sticks (products A) on which to work, which is linked to the fact that the products A do not have to be handled individually, but in clusters that simplify the change of format.

Conveniently the assembly 1 for the sorted conveyance of substantially plate-like products A is low cost, is easily and practically implemented and safely applied.

The disclosure, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The disclosures in Italian Patent Application No. BO2014A000131 from which this application claims priority are incorporated herein by reference.

The invention claimed is:

1. An assembly for the sorted conveyance of substantially plate-like products, the assembly comprising a stroke limiting shoulder disposed downstream of at least one supply line, a first pusher having a lateral surface that faces and is proximate to said stroke limiting shoulder, and at least one second pusher, which is adjacent to the first pusher, said first and second pushers being substantially perpendicular to an advancement direction of the products on each respective supply line and being independently movable from a first configuration, in which a respective end face faces and is proximate to an edge of said at least one supply line, externally thereto, to a second configuration, in which said end face faces and is proximate to an edge of at least one exit channel, surmounting the respective supply line, said exit channel comprising consecutive receptacles for accommodating clusters of products, a sum of all the products of said clusters being equal to a predefined number of products of said bundle.

2. The assembly according to claim 1, wherein said pushers are two in number, said first pusher being downstream of said at least one supply line and upstream of said stroke limiting shoulder, with a lateral surface that faces and is proximate to said shoulder, said second pusher, which is arranged upstream of said first pusher so that its lateral surface that is located downstream is adjacent to the lateral surface that is located upstream of said first pusher, said pushers being independently movable from a first configuration, in which the respective end face faces and is proximate to the edge of said at least one supply line, externally thereto, to a second configuration, in which said end face faces and is proximate to the edge of said at least one exit channel, surmounting the respective supply line, said exit channel comprising pairs of consecutive receptacles for accommodating clusters of products, the sum of all the products of said clusters being equal to said predefined number of products of said bundle.

3. The assembly according to claim 2, wherein each pair of receptacles comprises a first receptacle for accommodating at least two products and a second receptacle for accommodating at least three products.

4. The assembly according to claim 3, wherein each pair of receptacles comprises a first receptacle for accommodating three products arranged side by side and a second receptacle for accommodating four products arranged side by side.

5. The assembly according to claim 1, wherein said supply lines are two in number, arranged side by side and are parallel, each line comprising a respective stroke limiting shoulder and, arranged laterally and transversely, a respective first pusher and at least one respective second pusher which is adjacent, said pushers being substantially perpendicular to the advancement direction of the products on the respective supply line.

6. The assembly according to claim 5, wherein said exit channel is interposed between the end portions of said two supply lines, said pushers of said first line and said pushers of said second line being arranged externally to the respective line and opposite said exit channel and being mutually offset with respect to the advancement direction of the products.

7. The assembly according to claim 1, wherein the face of each pusher has a width that does not exceed a length of the cluster of consecutive products arranged side by side that it must transfer from the respective line for the supply of plate-like products to the respective exit channel.

8. The assembly according to claim 1, wherein said exit channel comprises a plurality of mutually articulated units, each unit comprising separate receptacles for accommodating respective clusters of products.

\* \* \* \* \*